(12) United States Patent
Schuster et al.

(10) Patent No.: US 8,526,012 B1
(45) Date of Patent: Sep. 3, 2013

(54) NONCONTACT SCANNING SYSTEM

(75) Inventors: C. Martin Schuster, Shorewood, MN (US); Gregory G. Hetzler, Minneapolis, MN (US)

(73) Assignee: Laser Design, Inc., Bloomington, MN (US)

( * ) Notice: Subject to any disclaimer, the term of this patent is extended or adjusted under 35 U.S.C. 154(b) by 0 days.

(21) Appl. No.: 13/448,598

(22) Filed: Apr. 17, 2012

(51) Int. Cl.
*G01B 11/30* (2006.01)

(52) U.S. Cl.
USPC .......................................................... 356/612

(58) Field of Classification Search
USPC .......................................................... 356/612
See application file for complete search history.

(56) References Cited

U.S. PATENT DOCUMENTS

| | | | |
|---|---|---|---|
| 2,335,941 A | 12/1943 | Howard | |
| 3,055,120 A | 9/1962 | Scott | |
| 3,529,520 A | 9/1970 | Thiebault | |
| 4,041,476 A | 8/1977 | Swainson | |
| 4,891,767 A * | 1/1990 | Rzasa et al. | 700/259 |
| 4,925,139 A | 5/1990 | McCord | |
| 5,124,524 A | 6/1992 | Schuster et al. | |
| 5,251,156 A | 10/1993 | Heier et al. | |
| 5,820,623 A | 10/1998 | Ng | |
| 5,848,115 A | 12/1998 | Little et al. | |
| 6,567,162 B2 | 5/2003 | Koren et al. | |
| 6,687,328 B2 | 2/2004 | Bavendiek et al. | |
| 7,099,432 B2 | 8/2006 | Ichihara et al. | |
| 7,187,457 B2 | 3/2007 | Kobayashi | |
| 7,492,862 B2 | 2/2009 | Bendahan | |
| 7,570,359 B2 | 8/2009 | Fox | |
| 7,574,035 B2 | 8/2009 | Koonankeil | |
| 7,692,137 B2 * | 4/2010 | Aoki et al. | 250/221 |
| 7,840,371 B2 | 11/2010 | Gaspardo et al. | |
| 7,920,294 B2 | 4/2011 | Marumoto | |
| 7,978,346 B1 | 7/2011 | Riza | |
| 2004/0246473 A1 | 12/2004 | Hermarv et al. | |
| 2010/0149550 A1 | 6/2010 | Diefenbacher et al. | |
| 2010/0312370 A1 | 12/2010 | Lind et al. | |
| 2011/0080592 A1 | 4/2011 | Sato | |
| 2011/0080593 A1 | 4/2011 | Sato | |
| 2011/0080594 A1 | 4/2011 | Gaspardo et al. | |
| 2011/0090513 A1 | 4/2011 | Seidl et al. | |

\* cited by examiner

*Primary Examiner* — Tu Nguyen
(74) *Attorney, Agent, or Firm* — Haugen Law Firm PLLP

(57) ABSTRACT

A noncontact object scanning system includes a horizontal table rotatable on a vertical axis, one or more scanners above the table and one or more scanners below the table. The table allows passage of radiant energy therethrough due to its transparency or construction as a nonreflective grid. A controller automatically steps the scanners through a scanning sequence, each scan associated with a segment of the object's exterior surface. Surface segments scanned from above the table and from below the table combine to provide a comprehensive scan of the entire exterior surface. Adjacent surface segments overlap one another to provide redundant data used to overcome shadowing effects from the grid and to accurately align and merge the segments into a three dimensional representation of the complete exterior shape of the object. The scanners can incorporate color responsive light detectors whereby the three dimensional representation portrays color and shape.

28 Claims, 2 Drawing Sheets

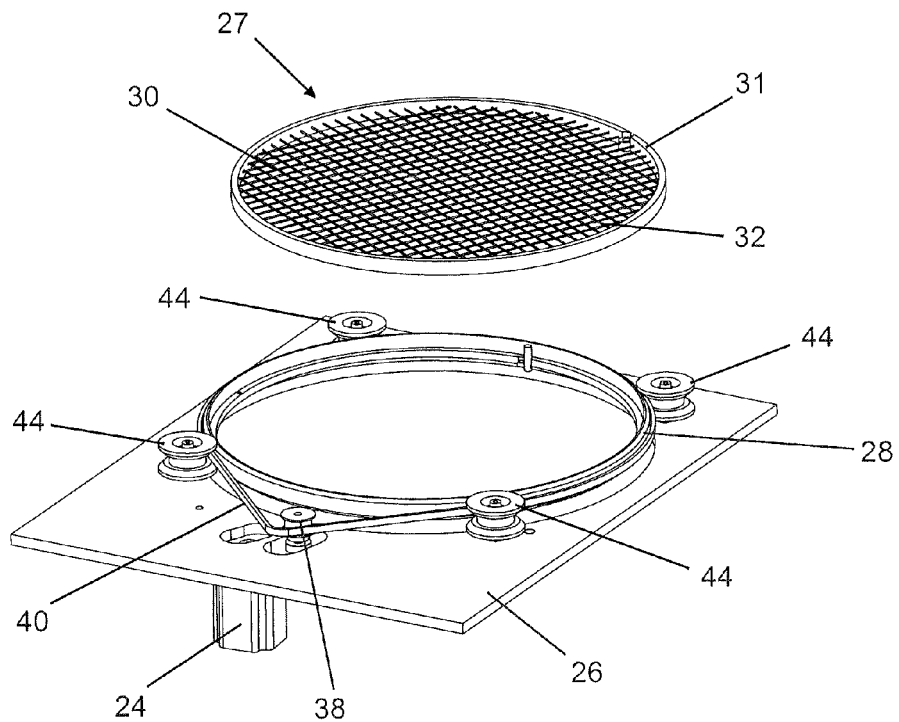
FIG. 2
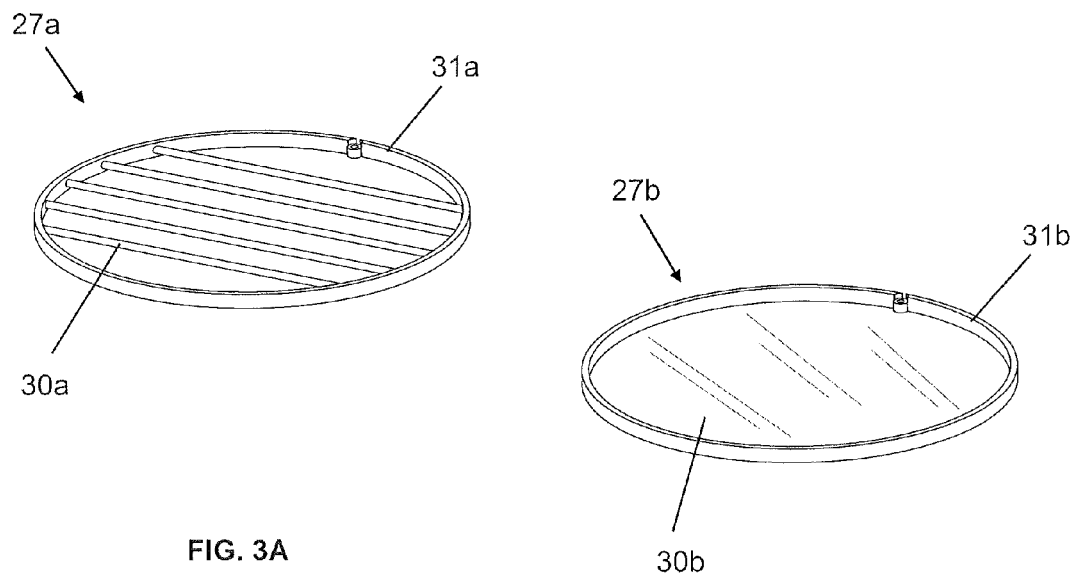
FIG. 3A
FIG. 3B

NONCONTACT SCANNING SYSTEM

BACKGROUND OF THE INVENTION

The present invention relates to scanning devices and systems for generating three dimensional data characterizing the exterior or surface of a scanned object, and more particularly to noncontact scanning devices and systems automated to minimize the need for operator intervention.

The ability to replicate the exterior surface of an article, accurately in three dimensional space, is becoming increasingly useful in a wide variety of fields. Industrial and commercial applications include reverse engineering, inspection of parts and quality control, and for providing digital data suitable for further processing in applications such as computer aided design and automated manufacturing. Educational and cultural applications include the reproduction of three dimensional works of art, museum artifacts and historical objects, facilitating a detailed study of valuable and often fragile objects, without the need to physically handle the object. Medical applications for full and partial scanning of the human body continue to expand, as well as commercial applications providing 3D representations of products in high detail resolution to internet retail catalogs.

In general, three dimensional noncontact scanning involves projecting radiant energy, for example laser light or projected white light structured in patterns, onto the exterior surface of an object, and then using a CCD array, CMOS array, or other suitable sensing device to detect radiant energy reflected by the exterior surface. The energy source and energy detector typically are fixed relative to each other and spaced apart by a known distance to facilitate locating the point of reflection by triangulation. In one approach known as laser line scanning, a planar sheet of laser energy is projected onto the object's exterior surface as a line. The object or the scanner can be moved to sweep the line relative to the surface to project the energy over a defined surface area. In another approach known as white light projection or referred to more broadly as structured light, a light pattern (typically patterned white light stripes) is projected onto the object to define a surface area without requiring relative movement of the object and scanner.

Scanned objects usually are supported on a table or base, which can be moved in a linear or rotary fashion (or both) to expose different regions of the exterior surface to the light source. The light source can be supported movably, or several sources can be used to project the light selectively onto different regions of the exterior surface. Nonetheless, most scanning systems require multiple orientations of the scanned object to provide a complete, uninterrupted scan of the entire exterior surface. At the very least, an object supported on a horizontal table or base must be turned over to provide scanner access to its previously inaccessible "underside." Frequently, the shape of an object does not lend itself to a simple "turning over" to reveal previously unexposed surface regions, requiring several manual or robotic reorientations of the object between successive scans. The need to reposition the object increases the time, complexity and expense of the scanning process, not only due to the additional scans and repositioning between scans, but also due to the difficulty encountered in registering the separate scans, i.e. properly aligning the scans with respect to each other to position the scans in the same three dimensional space. In conventional scanning systems, the repositioning and reorienting of objects and the merging of the separate scans into a single useful database require considerable skill on the part of the system operator.

In many conventional scanning systems, the table or base supports the scanned object by gravity. The desired number of scanners are disposed above the base, exposing upwardly facing and horizontally facing regions of the exterior surface to energy projected by the scanners while leaving a downwardly facing "underside" of the object unexposed. A published U.S. Patent Application, published under publication no. 2004/0246473 (Hermary et al.), discloses a system in which scanners are positioned beneath an object as well as above the object to expose the underside for scanning. More particularly, a scanning device for logs or boards positions four scanning heads in surrounding relation to a log or board move axially through the system. The scanners, two above the log and two below the log, are spaced in 90 degree increments in a plane perpendicular to the axial direction. The system requires the log or board to be moved axially for scanning, and does not scan the opposite ends of the board or log.

U.S. Pat. No. 7,187,457 (Kobayashi) discloses a system for measuring the size of an object based on two-dimensional projected images. The article to be measured is placed on a transparent glass plate. A frame, movable horizontally with respect to the glass plate, has an upper region that supports a row of photodetectors. A lower portion of the frame supports a row of light emitting diodes. Although the device is capable of measuring the size of the article in the direction in which the photo detectors are arranged, measurements of size in multiple directions would require multiple reorientations of the object.

The forgoing systems, although useful in certain applications, fail to address the feature of generating data sufficient to replicate an entire uninterrupted exterior shape of a scanned three dimensional object, through a single scanning sequence without operator intervention. Certain approaches characterized as "full surface" scans, e.g. the scan of a sculpture standing upright on a pedestal or a medical scan of the head, likewise fail to address this feature, due to a substantial void (bottom of the pedestal, or area of the neck) in the resulting scan data.

In some applications, this void is inconsequential. In other applications, such as the inspection of an industrial part, the replication of a three dimensional work whose entire exterior surface is part of the artistic expression, or the replication of a commercial product in its entirety, the void is critical.

Accordingly, the present invention involves several aspects, each directed to one or more of the following objects:

to provide a noncontact scanning system capable of generating a complete three dimensional scan of an object's entire viewable exterior surface in a single, automated scanning operation;

to provide a noncontact scanning system incorporating a support structure functionally transparent to radiant energy to allow a complete surface scanning while the support structure maintains the object in a viewing volume for scanning;

to provide a process for automatically scanning the exterior surface of an object in a manner that generates redundant data corresponding to overlapping surface regions and employs the redundant data to more effectively merge and align data from multiple scans of the object; and to provide a totally automated noncontact scanning system usable by unskilled individuals to generate data in a three dimensional coordinate system representing the complete, uninterrupted exterior shape, and if desired further representing the color, of a scanned object.

SUMMARY OF THE INVENTION

To achieve these and other objects, there is provided a noncontact object scanning system. The system includes a support structure for maintaining an object completely within a predetermined viewing volume for exposure to radiant energy for surface scanning. The support structure, at least within and proximate the viewing volume, is formed of a material substantially nonreflective of the radiant energy. The support structure is adapted to allow passage of the radiant energy therethrough.

The scanning system includes a scanning apparatus comprising a radiant energy source located outside of the viewing volume to direct the radiant energy onto the object maintained in the viewing volume, and a radiant energy sensor adapted to detect the radiant energy reflected by an exterior surface of the object visible from outside the viewing volume.

A controller is operatively associated with the scanning apparatus to automatically step the scanning apparatus through a sequence of scans of the object maintained in the viewing volume. Each of the scans comprises directing the radiant energy onto a selected segment of the exterior surface associated with the scan, and detecting the radiant energy reflected by the associated segment to generate a surface data set representing a three-dimensional shape of the associated segment. The sequence of scans consists essentially of direct scans of first selected segments disposed to receive the radiant energy directly from the radiant energy source, and indirect scans of second selected segments disposed to receive the radiant energy via passage of the radiant energy through the support structure. The first segments and second segments in combination comprise substantially the entire visible exterior surface.

An information processor is coupled to receive the surface data sets associated with the scans of the sequence, and adapted to merge and align the surface data sets into a selected three dimensional coordinate space. Thus the processor generates, in the three dimensional space, a three dimensional representation of an entire continuous exterior shape of the object.

For example, the shape of the object can be represented by a high density point cloud or a tessellated polygon mesh.

In a preferred scanning system, the support structure comprises a base having a horizontal surface for supporting the object by gravity. The scanning apparatus advantageously includes at least one scanner disposed above the base, and at least one below the base. The radiant energy from any scanner below the base must pass through the base to reach the scanned object. In one preferred approach, the base is formed as a radiant energy absorptive grid. In another approach, the base is formed of a transparent material.

The required transparency of the base is provided by the interstitial regions between adjacent members of the grid. Nonetheless, two aspects of the grid potentially interfere with obtaining a complete exterior surface representation. The first of these is the shadow cast by the grid onto the exterior surface of the object. Second, the grid prevents radiant energy from reaching the portion of the object's surface contiguous with the grid.

The shadowing tendency is overcome by configuring the controller to perform several scans in which the radiant energy is projected onto a given surface segment from different angles, and by generating each surface data set in a manner that perceives shadowed areas as voids, based on the failure of reflected energy to reach a predetermined threshold. Later, when several surface data sets corresponding to the given surface area or segment are merged, voids in a given one of the surface data sets are filled with data from another surface data set where a different angle of incidence has effectively shifted the shadow caused by the grid.

Of course, voids due to direct contact of the grid with the scanned object cannot be effectively shifted in this manner. However, the voids due to grid/object contact are small due to the size of the members of the grid (0.0625 inches in one example), and can be filled using standard void filling techniques based on the data describing the rest of the exterior surface.

Alternatively, the base can be formed of glass, to provide object support along with complete transparency to the radiant energy. This approach typically requires calibration of any scanning head positioned below the base, although a high quality glass can reduce the need. A glass base must be kept clean to avoid contamination by foreign matter such as dirt or fingerprints.

Another aspect of the present invention is a process for generating an exterior surface scan of an object, including:

(a) using a support structure to maintain an object completely within a predetermined viewing volume, wherein the support structure at least within and proximate the viewing volume is constructed of a nonreflective material and is configured to allow passage of radiant energy therethrough;

(b) with the object maintained in the viewing volume, scanning the object by directing radiant energy onto an exterior surface of the object from outside the viewing volume automatically in a sequence of scans, wherein each of the scans comprises directing radiant energy onto a selected segment of the exterior surface associated with the scan, wherein the sequence of scans consists essentially of a plurality of direct scans on first selected segments receiving the radiant energy directly from the radiant energy source and a plurality of indirect scans of second selected segments receiving the radiant energy via passage of the radiant energy through the support structure, and wherein the first and second segments in combination comprise substantially the entire visible exterior surface;

(c) detecting the radiant energy reflected by the selected segments to generate with respect to each segment, a surface data set describing a three dimensional shape of the associated segment; and (d) merging and aligning the surface data sets in a selected three dimensional coordinate space to generate in said space a three dimensional representation of an entire continuous exterior shape of the object.

The sequence of scanning can be accomplished through controlled movement of the object, the scanners, or both. For example, when the object is supported by gravity on a base, the base can be configured for rotation about a vertical axis. Scanners, positioned above the base and below the base, can be configured for movement in vertical planes that contain the axis, e.g. in arcuate paths as disclosed in U.S. Pat. No. 7,840,371 (Gaspardo et al.). In alternative approaches, the object may be supported by preferably nonreflective structure for rotation about several different axes.

The sequence of scans can be performed by stepped motion or indexing of the object, for example by stepped rotation for scanning each surface segment. Each scan can itself involve controlled movement: for example, laser line scanning with a sheet in a vertical plane impinging upon the object as a line, combined with a controlled rotation of the object such that the line is swept over a surface segment.

Alternatively, the radiant energy can be directed to the object as a volume, e.g. defining a cone, forming a defined surface area corresponding to the surface segment, in which case the object is held stationary during the scan. In either approach, it is advantageous to provide radiant energy sources and radiant energy sensors in pairs, spaced with respect to one another and fixed in a scanning device. This approach facilitates the use of triangulation to generate the surface data sets.

The scanning sequence preferably comprises directing the radiant energy onto adjacent selected segments that overlap one another. This results in surface data sets for adjacent segments with redundant data corresponding to the overlap of the segments. The overlap feature counteracts the shadowing tendency of a nonreflective grid as discussed above. Further, the redundant data corresponding to the overlap of adjacent surface segments can be used by the processor to align the adjacent segments in the selected three dimensional coordinate space with a high degree of precision.

Thus in accordance with the present invention, a scanning system performs a complete scan of the viewable exterior surface of the scanned object and generates a complete three dimensional representation of an entire continuous exterior shape of the object, without requiring object repositioning or any other intervention by the operator.

IN THE DRAWINGS

For a further understanding of the above and other aspects and advantages of the invention, reference is made to the following detailed description and to the drawings, in which:

FIG. 2 is a perspective exploded parts view of a rotatable base and adjacent structure for supporting the object during scans;

FIGS. 3A and 3B illustrate alternative support structures;

Figure 5:
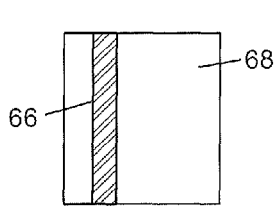
Figure 6:
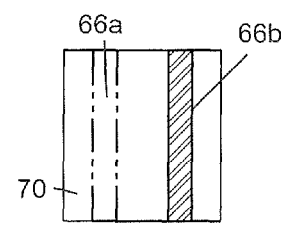
Figure 7:
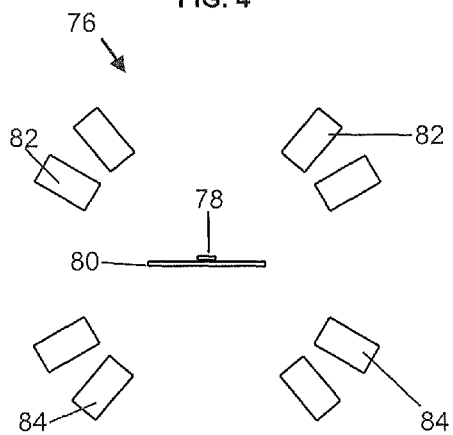
Figure 8:
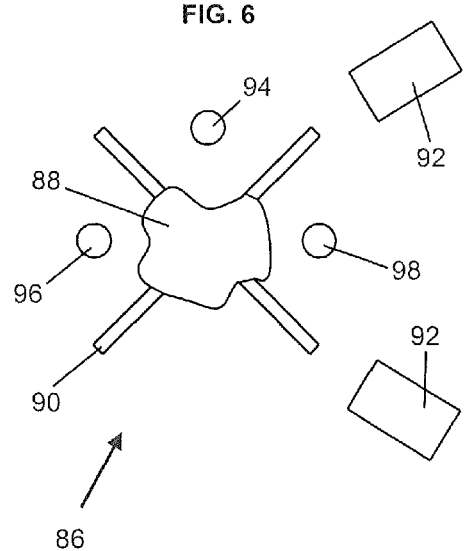

FIGS. 5 and 6 schematically illustrate operation of the system to counteract shadowing;

FIG. 7 illustrates features of an alternative embodiment noncontact scanning system; and FIG. 8 illustrates features of another alternative noncontact scanning system.

DETAILED DESCRIPTION OF THE PREFERRED EMBODIMENTS

Figure 1:
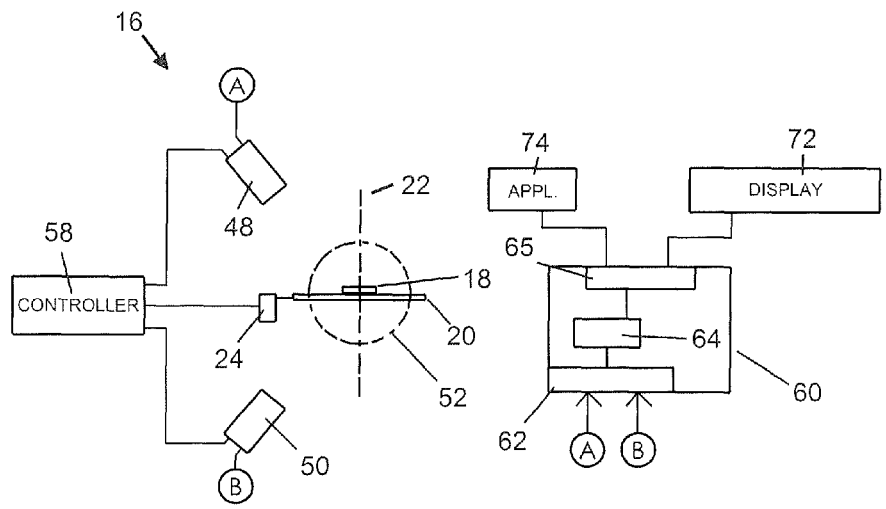
FIG. 1 is a schematic view of a noncontact object scanning system constructed in accordance with the present invention.

Turning now to the drawings, FIG. 1 illustrates an object scanning system 16 configured to perform a complete exterior surface scan of an object, and to use data generated by the scanning sequence to generate a three dimensional representation of an entire continuous exterior shape of the object. An object 18 to be scanned is supported for controlled motion on a table or base 20 having a horizontal upper surface and rotatable about a vertical axis 22 with respect to a fixed support frame. A motor 24 is operatively coupled to table 20 to controllably rotate the table and object 18, at a constant speed or in a sequence of steps for indexing the position of the object, as required.

FIG. 2 shows the object support structure in more detail. Table 20 includes a stationary frame or platform 26 and a circular rim 28 mounted to rotate relative to the platform. An insert 27 includes a circular rim 31 and multiple carbon fiber rods 30 extended in two perpendicular directions to form a horizontal grid 32 supported by rim 31. Rim 31 can be removably fixed within rim 28 for rotation of the grid with rim 28. Motor 24, fixed to platform 26, rotates a drive pulley or gear 38. The drive pulley or gear can be coupled to rim 28 directly or through a power transmission system that may include a gear box. A belt 40 surrounds rim 28 and is trained around the drive pulley. Four rotatable guides 44 cooperate to maintain the belt against rim 28. A cover (not shown) can be mounted above frame 26 to overlie the frame, belt and pulleys. The cover has an opening to accommodate insert 27.

Preferably, several inserts are provided for removable mounting within rim 28. FIG. 3A illustrates an insert 27a including a series of parallel carbon fiber rods 30a supported by a rim 31a. FIG. 3B illustrates another alternative insert 27b including an optically clear glass plate 30b supported by a rim 31b. Interchangeable inserts 27, 27a, and 27b enhance the utility of system 16 by facilitating selection of the support surface most suitable for any given object.

Referring to FIG. 1, a scanning head or scanner 48 is supported above table 20, and a similar scanner 50 is mounted below the table. Each of the scanners can be fixed, but more preferably is supported for arcuate movement in a vertical plane containing axis 22 to facilitate a more comprehensive surface scanning of the object. Scanners 48 and 50, and any additional scanners of the system, cooperate to define a viewing volume or scanning envelope, which can be spherical as indicated at 52. Object 18 may be rotated or held stationary during a scanning sequence, but in either event is maintained completely within the scanning envelope.

Segments of the exterior surface disposed above table 20 and facing upwardly or outwardly away from the object are exposed to scanner 48 for direct scanning. The remaining, generally downwardly facing segments of an underside of the object are exposed only for scanning by lower scanner 50, with radiant energy from the scanner reaching those segments only after passing through grid 32. For convenience, this can be referred to as indirect scanning. The directly scanned and the indirectly scanned segments together provide comprehensive coverage of the entire exterior surface.

Figure 4:
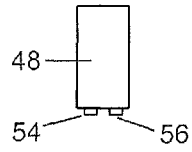
FIG. 4 is an enlarged view of one of the scanning heads employed by the system.

With reference to FIG. 4, scanner 48 includes a radiant energy source 54, e.g. a laser or white light projector. The laser energy can be projected as a planar sheet impinging onto object 18 as a line. In contrast, the structured light as projected toward the object defines a volume, for example a cone, and impinges upon the object as a defined surface area. Accordingly, a scan of a surface area segment of the object's exterior surface can be performed with the scanner and object stationary relative to each other. A surface area scan using a laser, line projector involves controlled movement of the object, e.g. rotation about axis 22 with respect to the scanner, to sweep a surface area segment.

Scanner 48 further includes a radiant light energy sensor 56 such as a CCD camera. Source 54 and sensor 56 are spaced apart and fixed relative to one another, providing a known distance between the source and sensor and enabling the use of triangulation to locate multiple points along the surface of the object based on sensed reflected radiant energy. In applications that require higher accuracy, scanner 48 can include two CCD cameras. Scanner 50 is substantially identical to scanner 48.

With reference to FIG. 1, a controller 58 is operably coupled to motor 24 and scanners 48 and 50. The controller governs motor 24 to control rotation of table 20. In systems employing movable scanners, controller 58 further governs motion of the scanners in concert with table rotation, to index or step the object through a sequence of scans. Each scan is associated with a surface segment of the object's exterior surface, in the sense that the scan involves directing the radiant energy onto the selected surface segment. The size (surface area) of each segment may be a small fraction of the exterior surface, or may constitute a major portion of the exterior surface. In either event, the selected surface segments in combination constitute the entire exterior surface of the object. Thus, the scan sequence generates data sufficient for describing the entire exterior shape of the object.

Another feature of the scan sequence is that adjacent selected surface segments overlap one another. Overlapping or redundant data corresponding to the regions of overlap are useful in the merging and alignment of the separate scans, as will be described.

The radiant energy sensor in each of scanners 48 and 50 is configured to generate a set of surface data associated with each scan, describing an exterior shape of the associated selected surface segment. As indicated at A and B, scanners 48 and 50 provide the surface data sets to an information processor 60 for storage as digital data in a processor memory 62. The surface data sets from memory 62 are provided to a data conditioning application 64, a collection of computer programs incorporating coordinal deviation filters, proximity filters, and noise reduction filters running automatically to condition the data sets for more efficient and reliable merger into either a "point cloud" or a polygonal mesh in three dimensional space representing the object's exterior shape.

The data conditioning includes the removal of data that fails to meet or exceed a predetermined threshold, useful to counteract shadowing effects on the data generated by each scanner. Scanners 48 and 50, aided by a rotation of table 20, scan the entire exterior surface of object 18. This advantageously eliminates the need to turn the object over to expose its bottom surface to upper sensor 48. However, it requires table 20 to be functionally transparent to the radiant energy. When table 20 incorporates a grid as described in conjunction with FIGS. 2 and 3, light passes through the interstitial regions between adjacent carbon fiber rods, while light impinging upon the rods is largely absorbed. This projects a shadow of the grid onto the exterior surface located behind the grid with respect to the radiant energy source, as illustrated in FIG. 5 showing a shadow 66 formed on a surface segment 68. The radiant energy sensor either will detect shadow 66 as a void, or provide data corresponding to the shadow at an amplitude that fails to meet the threshold, and consequently is deleted from the surface data set as noise.

FIG. 6 illustrates surface segment 70 overlapping segment 68 and scanned at an angle different from the scan represented in FIG. 5. The different angle effectively shifts the shadow, from the location 66a to location 66b. The corresponding surface data set recognizes a void at location 66b. Later, when the surface data sets corresponding to segments 68 and 70 are combined, surface data of each segment fills the void in the other, so that the combined segments provide uninterrupted data.

FIGS. 5 and 6 illustrate the shadowing effect in simplified fashion to demonstrate how projecting the light at different angles, combined with conditioning of the surface data sets, counteracts the shadowing effect. Although the shadow actually formed by the grid is more complex, a sufficient number of overlapping surface segments scanned at differing angles can substantially eliminate the shadowing effect.

Beyond shadowing, table 20 also reduces exposure of the exterior surface to the scanners along the area of contiguous contact of the object and grid. Contiguous contact areas are perceived as voids in the surface data sets, and these voids can not be eliminated by altering the angle of light projection. However, these voids are small, due to the narrow diameter of the carbon fiber rods. Accordingly, the voids are filled in conditioning application 64 using standard hole filling techniques.

Data from conditioning application 64 is provided to a merging and alignment application 65 incorporating computer programs configured to combine the information from all of the surface data sets into a single image or three dimensional representation of the exterior surface shape of the scanned object. The application is configured to align adjacent surface data sets in the same three dimensional coordinate space, first through a low tolerance or approximate alignment based on the known locations of the scanners relative to table 20. This is followed by a higher tolerance alignment based on a least squares fitting of the data, using the redundant data corresponding to the overlapping surface regions between the adjacent surface segments. Once the surface data sets are merged and aligned into a point cloud or other three dimensional representation of the complete, uninterrupted exterior shape of the object, redundant data corresponding to overlapping surface regions can be removed.

The complete three dimensional surface representation can be provided to a display device 72 for viewing and manipulation. According to a further aspect of the present invention, scanners 48 and 50 can be provided with radiant energy sensors responsive to the color of the object being scanned. In this event, the surface data sets incorporate information concerning the color as well as shape, and the color information is incorporated into the point cloud, thus to characterize the object as to color and shape.

Alternatively, the three dimensional representation can be provided to a computer software application 74 for further processing, e.g. in a computer aided design or computer aided manufacturing process.

FIG. 7 illustrates part of an alternative noncontact scanning system 76 in which an object 78 to be scanned is supported on a transparent table 80 formed of glass. The system includes scanners 82 disposed above the table, on opposite sides of object 78 and at different heights and angular orientations with respect to the table. Scanners 84 below table 80 likewise are disposed on opposite sides of the object at differing angles and distances from the table. Glass table 80 can be rotatable about a vertical axis, if desired.

As compared to system 16, system 76 affords a comprehensive coverage of the entire exterior surface of the object, without requiring the same range of motion for the scanners.

FIG. 8 schematically illustrates another alternative system 86 for non-contact scanning, in which an object 88 to be scanned is supported by several rigid rods 90 of carbon fiber or other suitable nonreflective material. Scanners 92 are arranged about the suspended object. In addition to rods 90, the support structure incorporates three or more noncontact position-indicating features such as tooling spheres 94, 96, and 98 fixed within the viewing volume to provide points of reference. As the scanners are stepped through the scanning sequence, the surface scan data set associated with each scan includes position information provided by sensing radiant energy reflected by the tooling spheres. This provides unambiguous three dimensional position data for each of the scans, to facilitate their merger and alignment.

Similar tooling spheres can be provided to augment systems 16 and 76, mounted for example to the frame supporting the rotary table.

Thus in accordance with the present invention, a noncontact scanning system can be used to generate data representing the entire exterior shape of an object, in a single automated scanning operation that requires no operator input beyond initial placement of the object and starting the process.

What is claimed is:

1. A non-contact object scanning system, including:
   a support structure for maintaining an object completely within a predetermined viewing volume for exposure to radiant energy for surface scanning, wherein the support structure, at least within and proximate the viewing volume, is formed of a material substantially nonreflective of the radiant energy and further is adapted to allow passage of the radiant energy therethrough;

a scanning apparatus comprising a radiant energy source located outside of the viewing volume to direct the radiant energy onto the object maintained in the viewing volume, and a radiant energy sensor adapted to detect the radiant energy reflected by an exterior surface of the object visible from outside the viewing volume;

a controller operatively associated with the scanning apparatus to automatically step the scanning apparatus through a sequence of scans of the object maintained in the viewing volume, wherein each of the scans comprises directing the radiant energy onto a selected segment of the exterior surface associated with the scan, and detecting the radiant energy reflected by the associated segment to generate a surface data set representing a three-dimensional shape of the associated segment, wherein the sequence of scans consists essentially of direct scans of first selected segments disposed to receive the radiant energy directly from the radiant energy source, and indirect scans of second selected segments disposed to receive the radiant energy via passage of the radiant energy through the support structure, and the first segments and second segments in combination comprise substantially the entire visible exterior surface; and an information processor coupled to receive the surface data sets associated with the scans of the sequence, and adapted to merge and align the surface data sets into a selected three dimensional coordinate space to generate in said space a three dimensional representation of an entire continuous exterior shape of the object.

2. The system of claim 1 wherein:
the support structure comprises a base having a horizontal surface for supporting the object by gravity.

3. The system of claim 2 wherein:
the base is transparent to the radiant energy.

4. The system of claim 2 wherein:
the base comprises a grid absorptive of the radiant energy.

5. The system of claim 4 wherein:
the scanning apparatus comprises a first radiant energy source and a first radiant energy sensor disposed above the base, and a second radiant energy source and a second radiant energy sensor disposed below the base.

6. The system of claim 5 wherein:
each of the radiant energy sources is movable relative to the base to direct the radiant energy onto overlapping surface regions of the exterior surface at different angles with respect to the exterior surface.

7. The system of claim 2 wherein:
the base is rotatable about a vertical axis.

8. The system of claim 1 wherein:
the radiant energy source and the radiant energy sensor are fixed relative to one another and movable in concert with respect to the support structure.

9. The system of claim 1 further including:
a plurality of noncontact position-indicating features disposed within and fixed with respect to the viewing volume.

10. The system of claim 1 wherein:
the radiant energy source comprises a white light projection scanner.

11. The system of claim 1 wherein:
the radiant energy comprises a laser line scanner.

12. The system of claim 1 wherein:
adjacent ones of the segments overlap one another whereby the surface data sets representing adjacent surface segments comprise redundant data corresponding to an overlapping surface region common to the adjacent surface segments; and
the processor is adapted to use the redundant data region to align the adjacent surface segments in the selected three dimensional coordinate space.

13. The system of claim 1 wherein:
the processor is adapted to selectively delete a portion of the data in a given surface data set that fails to exceed a predetermined threshold.

14. The system of claim 1 wherein:
the support structure comprises a fixture adapted to suspend the object in the viewing volume through point contact with the exterior surface.

15. The system of claim 1 wherein:
the radiant energy sensor is color responsive whereby each surface data set further represents a color of the associated segment, and the processor is responsive to color-related information when merging and aligning the surface data sets whereby the three dimensional representation of the exterior shape further portrays a color of the object.

16. A process for generating an exterior surface scan of an object, including:
using a support structure to maintain an object completely within a predetermined viewing volume, wherein the support structure at least within and proximate the viewing volume is constructed of a nonreflective material and is configured to allow passage of radiant energy therethrough;

with the object maintained in the viewing volume, scanning the object by directing radiant energy onto an exterior surface of the object from outside the viewing volume automatically in a sequence of scans, wherein each of the scans comprises directing radiant energy onto a selected segment of the exterior surface associated with the scan, wherein the sequence of scans consists essentially of a plurality of direct scans on first selected segments receiving the radiant energy directly from the radiant energy source and a plurality of indirect scans of second selected segments receiving the radiant energy via passage of the radiant energy through the support structure, and wherein the first and second segments in combination comprise substantially the entire visible exterior surface;

detecting the radiant energy reflected by the selected segments to generate with respect to each segment a surface data set describing a three dimensional shape of the associated segment; and merging and aligning the surface data sets in a selected three dimensional coordinate space to generate in said space a three dimensional representation of an entire continuous exterior shape of the object.

17. The process of claim 16 wherein:
maintaining the object in the viewing volume comprises supporting the object by gravity on a base.

18. The process of claim 17 wherein:
the base comprises a grid absorptive of the radiant energy, and the scanning comprises directing the radiant energy redundantly onto at least the second selected segments at different angles.

19. The process of claim 17 wherein:
directing the radiant energy comprises providing a first radiant energy source above the base, and a second radiant energy source below the base for directing the radiant energy through the base and onto an underside region of the exterior surface.

20. The process of claim 19 wherein:
detecting the radiant energy comprises using a first radiant energy sensor associated with the first radiant energy source and a second radiant energy sensor associated with the second energy source.

21. The process of claim 16 wherein:
scanning the object comprises selectively rotating the base about a vertical axis.

22. The process of claim 16 wherein:
scanning the object comprises directing the radiant energy onto adjacent selected segments that overlap one another whereby the surface data sets representing adjacent segments comprise redundant data corresponding to a region of overlap; and
the merging and aligning of the surface data sets comprises fitting the redundant data to align the adjacent segments in the selected three dimensional coordinate space.

23. The process of claim 22 wherein:
merging and aligning the service data sets comprises deleting redundant data.

24. The process of claim 16 further including:
providing a plurality of noncontact position-indicating features disposed within and fixed with respect to the viewing volume;
wherein merging and aligning the surface data sets comprises locating each of the data sets with respect to the noncontact position-indicating features.

25. The process of claim 16 wherein:
generating the surface data sets comprises generating only the data that exceeds a predetermined threshold.

26. The process of claim 16 wherein:
generating a surface data set with respect to each segment further comprises generating data describing a color of the associated segment.

27. The process of claim 16 wherein:
directing the radiant energy onto the exterior surface comprises using a laser line scanner to project a linear image onto the exterior surface, and selectively moving the scanner with respect to the object to sweep the linear image over a surface area corresponding to the associated segment.

28. The process of claim 16 wherein:
directing the radiant energy onto the exterior surface comprises projecting structured light onto the exterior surface over a surface region corresponding to the associated segment.

* * * * *